United States Patent
Rose et al.

(10) Patent No.: US 7,190,121 B2
(45) Date of Patent: Mar. 13, 2007

(54) SYSTEMS AND METHODS TO CONTROL LIGHT-EMITTING DIODES

(75) Inventors: Tal Rose, Givat-Ada (IL); Avi Costo, Haifa (IL)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 10/921,492

(22) Filed: Aug. 19, 2004

(65) Prior Publication Data

US 2006/0038506 A1 Feb. 23, 2006

(51) Int. Cl.
- *H01J 1/60* (2006.01)
- *G08B 5/22* (2006.01)
- *G06F 1/00* (2006.01)

(52) U.S. Cl. .................. 315/129; 340/815.45; 713/340

(58) Field of Classification Search ................ 315/129, 315/291, 307, 308; 713/300, 310, 340; 340/815.4, 340/815.45

See application file for complete search history.

(56) References Cited

U.S. PATENT DOCUMENTS

| | | | | |
|---|---|---|---|---|
| 4,980,836 A | * | 12/1990 | Carter et al. | 713/322 |
| 5,686,887 A | * | 11/1997 | Chen et al. | 340/539.19 |
| RE36,189 E | * | 4/1999 | Carter et al. | 713/322 |
| 6,930,514 B2 | * | 8/2005 | McCollum et al. | 326/80 |
| 2004/0223326 A1 | * | 11/2004 | Wainwright | 362/231 |

OTHER PUBLICATIONS

William Hadden, [Edited by Bill Travis], "White-LED driver provides 64-step logarithmic dimming", Jun. 14, 2004, Reed Electronics Group, EDN.com. Retrieved from Internet: URL: >http://www.reed-electronics.com/ednmag/article/CA421508?text=white%2Dled>. 3pgs.

* cited by examiner

*Primary Examiner*—Thuy Vinh Tran
(74) *Attorney, Agent, or Firm*—Buckley, Maschoff & Talwalkar LLC (57) ABSTRACT

According to some embodiments, systems and methods may be employed for receiving a power consumption signal. An on-state of a light-emitting diode may be defined. A duty cycle of the light-emitting diode may be determined based at least in part on the power consumption signal. The duty cycle may reduce a power consumed by the light-emitting diode. The determination of the duty cycle may, for example, include varying at least one of an on time or an off time, for the on-state, of the light-emitting diode.

21 Claims, 6 Drawing Sheets

SYSTEMS AND METHODS TO CONTROL LIGHT-EMITTING DIODES

BACKGROUND

Illumination devices may be used in electronic components to provide visual indication of various states, modes, errors, and/or functions. For example, computer monitors, hard drives, disk drives, and network devices (e.g., interface cards, controllers, hubs, routers, or switches) may utilize Light-Emitting Diode (LED) devices to provide such indications. The connection status or line speed of a network connection may, for example, be indicated by the illumination (or lack thereof) of one or more LED devices on a Network Interface Card (NIC). In some applications, a controller or other logic device may cause one or more LED devices to be illuminated upon the occurrence of various events. The LED devices may, for example, be turned on, turned off, or blinked when a network connection is established. Such LED devices may be utilized in mobile platforms (e.g., notebook computers) because they tend to require small amounts of current as compared to other illuminating devices. As the power used by mobile computing devices and the desire for extended battery usage time increase however, even LED devices may consume undesirable amounts of power.

DETAILED DESCRIPTION

Some embodiments described herein are associated with a "network device". As used herein, the phrase "network device" may refer to any device that can communicate via a network. Examples of network devices include a Personal Computer (PC), a workstation, a server, a printer, a scanner, a facsimile machine, a copier, a Personal Digital Assistant (PDA), a storage device (e.g., a disk drive), a hub, a router, a switch, and a communication device (e.g., a modem, a wireless phone, etc.). Network devices may comprise one or more network components, such as a Static Random Access Memory (SRAM) device or module, a network processor, and a network communication path, connection, port, or cable.

In addition, some embodiments are associated with a "network" or a "communication network". As used herein, the terms "network" and "communication network" may be associated with the transmission of messages, packets, signals, and/or other forms of information between and/or within one or more network devices. By way of example, a network may be configured to operate in accordance with the Fast Ethernet LAN transmission standard 802.3-2002® published by the Institute of Electrical and Electronics Engineers (IEEE).

In addition, some embodiments are associated with a "duty cycle". As used herein, the term "duty cycle" may generally refer to any pattern, configuration, rate, intensity, and/or other setting associated with a LED device. In some embodiments, the duty cycle may refer to the rate and/or configuration of "turn-on" and/or "turn-off" periods associated with LED device illumination. For example, a duty cycle may specify that an LED device is to be illuminated (i.e., turned-on) for a period of time and then deactivated (i.e., turned-off). According to some embodiments, the duty cycle may be or include any number of patterns and/or combinations of turn-on and/or turn-off periods.

In some embodiments, the duty cycle may indicate an intensity level and/or a power consumption level at which an LED device is to be illuminated. According to some embodiments, the duty cycle may be associated with a signal (e.g., a signal that causes an LED device to operate in accordance with the duty cycle). In some embodiments, the signal itself may be the pattern defined by the duty cycle (e.g., the signal may oscillate in accordance with the duty cycle).

Figure 1:
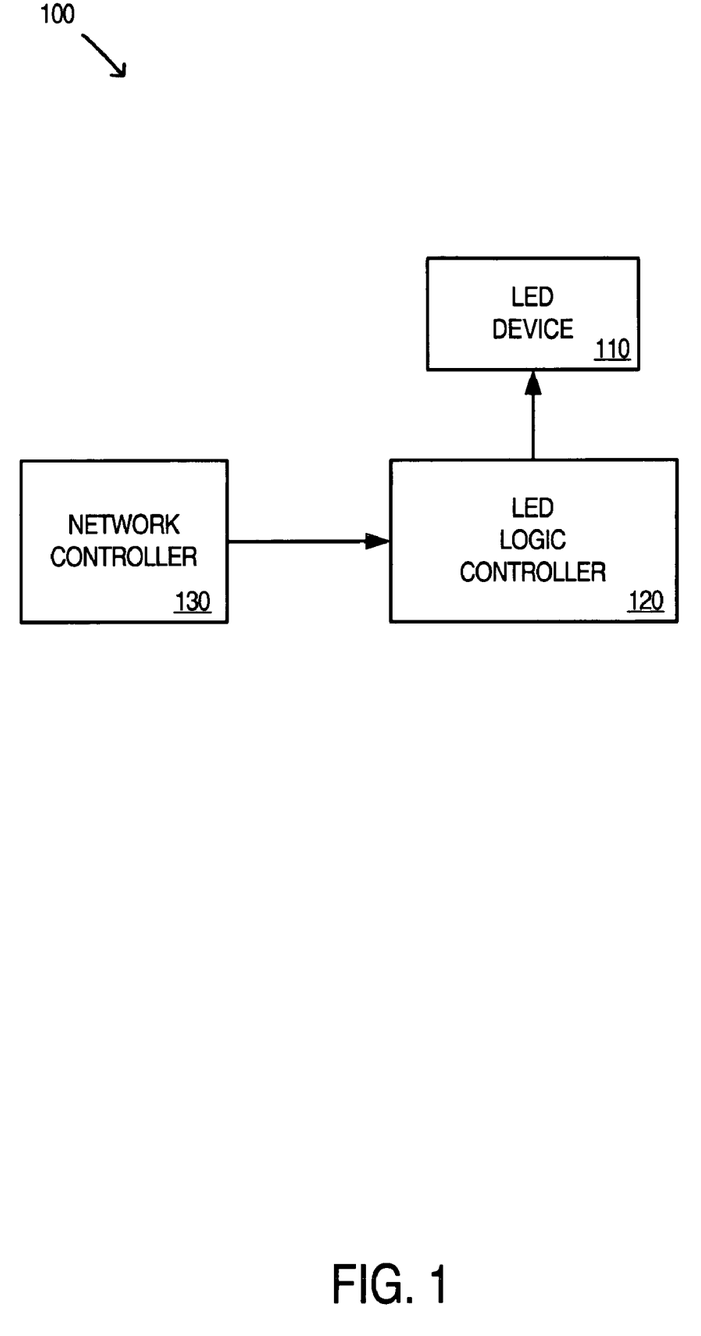
FIG. 1 is a block diagram of a network device.

Referring first to FIG. 1, a block diagram of a network device 100 is shown. The various systems described herein are depicted for use in explanation, but not limitation, of described embodiments. Different types, layouts, quantities, and configurations of any of the systems described herein may be used without deviating from the scope of some embodiments.

System 100 may comprise, for example, an LED device 110, an LED logic controller 120, and/or a network controller 130. Any or all of the components 110, 120, 130 of the system 100 may be included within and/or may otherwise be associated with a computing and/or mobile electronics device such as a PC, a notebook computer, a PDA, and/or a wireless telephone or other device (e.g., a network device). The system 100 may be or include, for example, a notebook computer such as an IBM® ThinkPad™ T42p with an Intel® Pentium® M 745 processor (and Intel® Centrino™ Mobile Technology) or a computer server such as an IBM® eServer™ xSeries 455 having one or more Intel® Itanium® 2 processors. In some configurations, the system 100 may be or include a Network Interface Card (NIC) such as a 3Com® Gigabit Server NIC.

The LED device 110 may be or include any number, type, color, and/or configuration of LED devices. The LED device 110 may be or include, for example, one or more B5-433-B525 Indium-Gallium-Nitrogen (InGaN) 525-nm (Green), 5-mm diameter, clear epoxy LED devices. In some configurations, such as where the system 100 is a NIC, the LED device 110 may be an LED array to provide visual indication of network connectivity, line speed, and/or communication status or errors. The LED device 110 may, in some configurations, be coupled to and/or otherwise interfaced with, managed, or controlled by the LED logic controller 120.

The LED logic controller 120 may, for example, receive signals, commands, and/or other information from the network controller 130 and may cause the LED device 110 to operate (e.g., illuminate) in accordance with such information. In some configurations, the LED logic controller 120 may send signals, commands, and/or other information to the LED device 110 to cause the LED device 110 to illuminate upon the occurrence of various events. For example, the LED device 110 may be illuminated when a network connection is established and/or during periods of network activity. The LED logic controller 120 may control the LED device 110 and/or may issue commands to the LED device 110 without requiring signals, commands, and/or other information from the network controller 130 (e.g., the LED logic controller 120 may incorporate built-in logic and/or processing capabilities). In some configurations, the LED logic controller 120 may interpret, decode, decipher, and/or otherwise process the information received from the network controller 130 in order to control the illumination of the LED device 110.

The network controller 130 may be, for example, a network processor, circuitry, and/or other logical or computational device associated with a NIC. In some configurations, the network controller 130 may manage and/or control network communications to and/or from the system 100. Upon the occurrence of certain events (e.g., establishing a network connection, or packet transmission errors) the network controller 130 may send signals and/or other information to the LED logic controller 120 to cause the LED device 110 to provide a desired visual indication.

The network controller 130 may detect, for example, incoming network communications and may send a signal indicative of such activity to the LED logic controller 120. The LED logic controller 120 may utilize the signal (and/or other information) received from the network controller 130 to determine an action required by the LED device 110. The LED device 110 may, for example, be turned-on, turned-off, and/or blinked in accordance with the visual indication desired for the given event (e.g., the incoming network communications). For example, the LED device 110 may be turned-on whenever incoming network communications are received, and may otherwise be turned-off. Such illumination of the LED device 110 may consume more power than is desirable.

Figure 2:
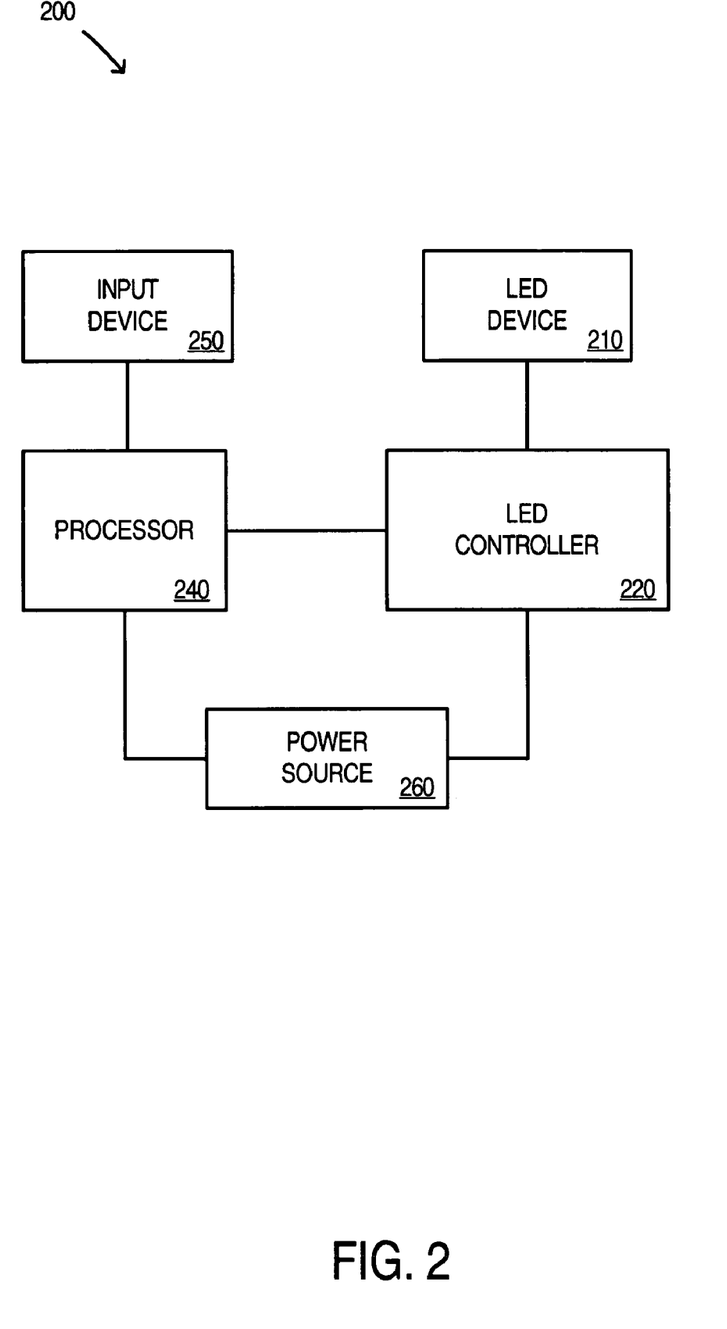
FIG. 2 is a block diagram of a system according to some embodiments.

Referring now to FIG. 2, a block diagram of a system 200 according to some embodiments is shown. The system 200 may include, according to some embodiments, an LED device 210, an LED controller 220, a processor 240, an input device 250, and/or a power source 260. In some embodiments, the components 210, 220 of the system 200 may be similar in configuration and/or functionality to the similarly-named components described in conjunction with FIG. 1. According to some embodiments, the components 210, 220 may include additional and/or differing functionality than the similarly-named components described in conjunction with FIG. 1. In some embodiments, fewer or more components than are shown in FIG. 2 may be included in the system 200.

The LED controller 220 may send various types of signals, commands, and/or other information to the LED device 210. Some signals and/or information may be similar to the logic signals, commands, and/or information described in conjunction with the LED logic controller 120. Other signals and/or information may be configured to cause the LED device 210 to perform other functions beyond simply turning-on, turning-off, and/or blinking. For example, the LED controller 220 may send signals to the LED device 210 that cause the LED device 210 to illuminate in accordance with a duty cycle. The duty cycle may be selected and/or determined by the LED controller 220 to, for example, reduce the amount of power consumed by the LED device 210. According to some embodiments, the LED controller 220 may be or include an oscillator such as a high-frequency oscillator that may, for example, send high-frequency signals associated with a duty cycle to the LED device 210.

In some embodiments, the LED controller 220 may receive a signal, command, and/or other information from the processor 240. The processor 240 may be or include, according to some embodiments, a processor of a PC, notebook computer, and/or other network device. In some embodiments, the processor may determine that the LED device 210 should be illuminated. The processor 240 may, for example, receive an indication that an event has occurred and may send a signal indicative of the occurrence of the event to the LED controller 220. Based on the received signal, the LED controller 220 may then, according to some embodiments, determine a duty cycle for the LED device 210.

For example, in some embodiments the event identified (and/or initiated) by the processor 240 may include an initiation of a low-power mode associated with the system 200. The indication of the low-power mode may, according to some embodiments, be received from the input device 250 (e.g., operated by a user) or may be initiated by the processor 240. In some embodiments, the processor 240 may send a signal and/or other information indicative of the low-power mode event to the LED controller 220. The LED controller 220 may then, for example, identify and/or otherwise determine an appropriate duty cycle for the LED device 210. An example of a duty cycle appropriate for the low-power mode event according to some embodiments may be or include setting the LED device 210 to a reduced intensity, turning-off the LED device 210, and/or causing the LED device 210 to blink at a rate and/or intensity selected to reduce the power consumed by the LED device 210.

The input device 250 may be, for example, a keyboard, a button, a pointing device (e.g., a mouse), and/or a touch-screen. In embodiments where the system 200 is a mobile computing platform for example, the input device 250 may be a keyboard and/or may be or include a particular button and/or key (e.g., a "set low-power mode" key or button). The input device 250 may be used, for example, to provide an indication to the processor 240. In some embodiments, the input device 250 may be utilized to indicate to the processor that a particular visual indication and/or duty cycle is desired for the LED device 210. The input device 250 may, for example, send a signal and/or other information to the processor 240 to cause the processor 240 to effectuate a desired duty cycle of the LED device 210 (e.g., by controlling and/or interfacing with the LED controller 220). In some embodiments, the input device 250 may be used to specify, identify, and/or otherwise determine or designate a particular duty cycle to be applied to the LED device 210 (e.g., a duty cycle may be picked from a list of available duty cycles).

In some embodiments, the system 200 may include the power source 260. According to some embodiments, such as where the system 200 is a mobile computing platform, the power source 260 may be a battery. The power source 260 may, for example, supply power to either or both of the LED controller 220 and the processor 240. In some embodiments, the LED device 210 may also or alternatively be supplied power by the power source 260. In such embodiments, the LED controller 220 may regulate and/or otherwise control the flow of power from the power source 260 to the LED device 210. According to some embodiments, the LED controller 220 may be or include a dimmer that is capable of controlling the intensity (and/or other illumination characteristics) of the LED device 210 (e.g., by regulating the amount of power supplied by the power source 260).

According to some embodiments, the power source 260 may initiate and/or otherwise define events associated with setting the duty cycle of the LED device 210. For example, the power source 260 may provide information to the processor 240 (and/or the LED controller 220) regarding characteristics associated with the power source 260. In some embodiments, the power source 260 may supply information relating to how much power is being used by the system 200, how much power is being provided by the power source 260, and/or how much power remains within the power source 260 (e.g., such as when the power source 260 is a battery). According to some embodiments, the processor 240 (and/or the LED controller 220) may monitor and/or solicit the power source 260 for power level and/or other power-related information (e.g., indicating whether an alternate power source is being used).

For example, the processor 240 may interface with the power source 260 to determine if the system 200 should be set to a low-power mode. In embodiments where the system 200 is a mobile computing platform and the power source 260 is a battery, for example, when the amount of power remaining in the power source 260 reaches and/or drops below a certain level (e.g., a pre-defined low-power level), the processor 240 may send a low-power signal to the LED controller 220 to cause the LED device 210 to be set to a duty cycle configured to save power. In some embodiments, a user operating the user device 250 may interface with the processor 240 to identify and/or set any pre-determined parameters that may trigger and/or require low-power duty cycles to be applied to the LED device 210.

Figure 3:
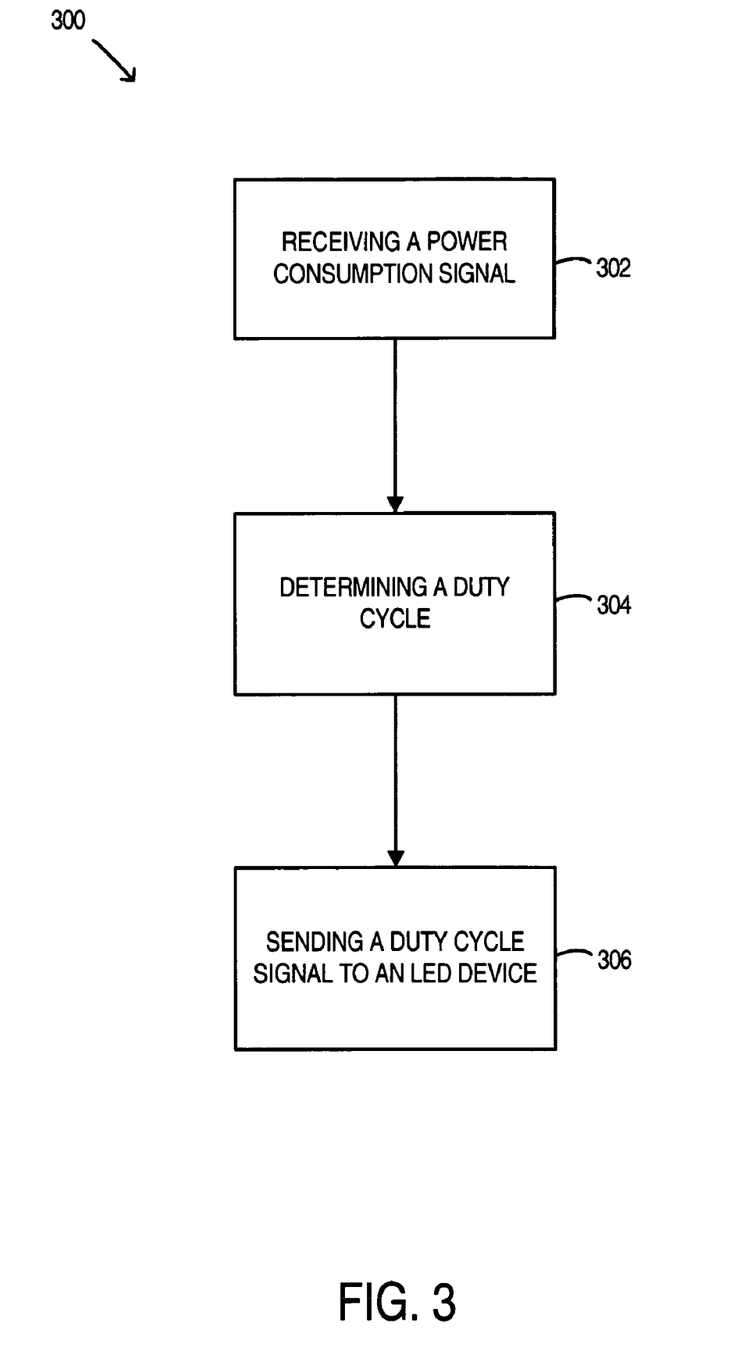
FIG. 3 is a flow diagram of a method according to some embodiments.

Referring now to FIG. 3, a method 300 according to some embodiments is shown. In some embodiments, the method 300 may be conducted by and/or by utilizing the system 200 described above and/or may be otherwise associated with the system 200 and/or any of the system components described in conjunction with FIG. 2. The flow diagrams described herein do not necessarily imply a fixed order to the actions, and embodiments may be performed in any order that is practicable. Note that any of the methods described herein may be performed by hardware, software (including microcode), firmware, manual means, or any combination thereof. For example, a storage medium may store thereon instructions that when executed by a machine result in performance according to any of the embodiments described herein.

In some embodiments, the method 300 may begin at 302 by receiving a power consumption signal. According to some embodiments for example, the LED controller 220 may receive a power consumption signal from the processor 240, the user device 250, and/or the power source 260. In some embodiments, the power consumption signal may be received by the processor 240 (e.g., from the input device 250 and/or the power source 260). The power consumption signal may be or include any type of information that is indicative of and/or associated with power consumption. For example, the power consumption signal may be a signal generated by the processor 240 to indicate that the LED device 210 should be set to a certain duty cycle. In some embodiments, the power consumption signal may indicate that the LED device 210 should be illuminated in a manner that reduces the amount of power consumed.

The method 300 may continue, according to some embodiments, by determining a duty cycle at 304. The duty cycle may be determined, for example, by the LED controller 220 based upon the power consumption signal received at 302. In some embodiments, the duty cycle may be defined and/or otherwise indicated by the power consumption signal. The duty cycle may also or alternatively be determined by using information provided by the power consumption signal to identify one or more appropriate duty cycles. For example, the power consumption signal may indicate that the power source 260 is getting low on power and that power should be conserved. The LED controller 220 may utilize this information, according to some embodiments, to lookup and/or identify one or more appropriate duty cycles that would reduce power consumption of the LED device 210.

In some embodiments, the LED controller 220 may retrieve duty cycle information from a memory and/or another storage device (e.g., a database, Read-Only Memory (ROM), or cache). The duty cycle information may, for example, be created and/or determined by a programmer, user, and/or other entity and stored in a memory device associated with the LED controller 220. According to some embodiments, the LED controller 220 (and/or the processor 240) may determine an appropriate duty cycle (and/or choose a duty cycle from a group of available and/or appropriate duty cycles) by applying logic and/or other criteria to the power consumption information. For example, the LED controller 220 may receive the power consumption signal indicating a low-power mode and may determine that the LED device 210 should be turned-off until the low-power mode is terminated (e.g., when the power source 260 is recharged). The determination that the duty cycle may include turning the LED device 210 off for a period of time may, for example, be determined based on logic stored within the LED device 220 and/or may be looked up in a table and/or file.

According to some embodiments, the duty cycle may include a simple command to turn power to the LED device 210 off for a period of time (e.g., until the low-power mode is terminated). In some embodiments, the duty cycle may include reducing the intensity of the LED device 210 and/or alternating turn-on periods with turn-off periods for the LED device 210. For example, the duty cycle may define various blink rates to be applied to the LED device 210. In some embodiments, the blink rates may be uniform in alternating turn-on and turn-off periods and/or intensities during the turn-on periods. According to some embodiments, the properties of the duty cycle (e.g., intensity, turn-on period length, turn-off periods length, etc.) may vary randomly or in accordance with one or more patterns, rates, and/or strategies. More details regarding duty cycles according to some embodiments are provided in conjunction with FIG. 5A and FIG. 5B.

At 306, the method 300 may continue by sending a duty cycle signal to an LED device. The duty cycle signal may, for example, be a high-frequency signal and/or may include information indicative of the duty cycle determined at 304. In some embodiments, the LED controller 220 may send the duty cycle signal to the LED device 210. The duty cycle signal may, according to some embodiments, cause the LED device 210 to illuminate in accordance with the duty cycle. For example, the duty cycle signal may be or include an electrical signal and/or pulse that supplies power to the LED device 210. In some embodiments, the duty cycle signal may be oscillated, pulsed, and/or otherwise varied to cause the LED device 210 to illuminate in accordance with the desired duty cycle. According to some embodiments, a duty cycle signal and/or a component of a duty cycle signal may be sent to the LED device 210 when a change in the illumination of the LED device 210 is appropriate. In some embodiments, a duty cycle signal may be continually sent to the LED device 210 when the LED device 210 is to be illuminated.

Figure 4:
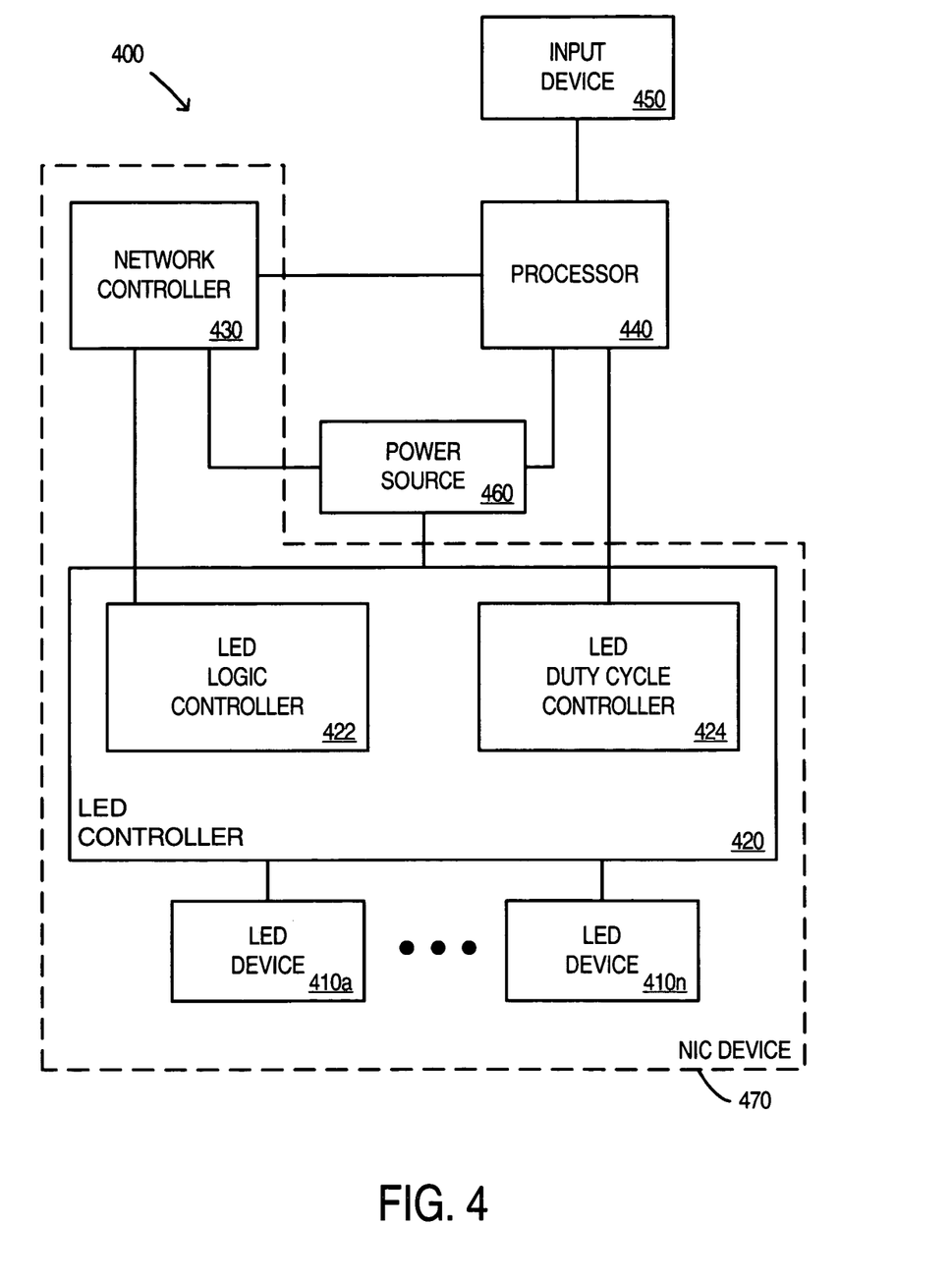
FIG. 4 is a block diagram of a system according to some embodiments.

Turning now to FIG. 4, a block diagram of a system 400 according to some embodiments is shown. The system 400 may include, according to some embodiments, one or more LED devices 410a–n and/or an LED controller 420. In some embodiments, the LED controller 420 may include an LED logic controller 422 and/or an LED duty cycle controller 424. The system 400 may also include a network controller 430, a processor 440, an input device 450, and/or a power source 460. In some embodiments, the components 410, 420, 430, 440, 450, 460 of the system 400 may be similar in configuration and/or functionality to the similarly-named components described in conjunction with any of FIG. 1 and/or FIG. 2. According to some embodiments, the components 410, 420, 430, 440, 450, 460 may include additional and/or differing functionality than the similarly-named components described in conjunction with any of FIG. 1 and/or FIG. 2. In some embodiments, fewer or more components than are shown in FIG. 4 may be included in the system 400.

According to some embodiments, any of the components 410, 420, 430, 440, 450, 460 of the system 400 may be included within and/or associated with a single component. As shown in FIG. 4 for example, the LED devices 410*a*–*n*, the LED controller 420 (and/or its components 422, 424), and/or the network controller 430 may be included within and/or may be components of a NIC device 470. In such embodiments, the LED controller 420 may not need to be coupled to and/or be in direct communication with the processor 440 and/or the power source 460 (e.g., any communications and/or power requirements may be satisfied via the network controller 430 and/or the NIC device 470). In some embodiments, the NIC device 470 may be an Synchronous Optical NETwork (SONET) interface card that operates in accordance with the American National Standards Institute (ANSI) T1.105.04 "SONET—Data Communication Channel Protocol and Architectures" standard (1995; revised 2001). In such embodiments, the network controller 430 may be an SONET controller and/or network processor, and the LED devices 410*a*–*n* may be visual indicators of network connectivity (e.g., LED devices that protrude from the NIC device 470 so that they may be viewed by a user).

In some embodiments, the system 400 may be or include a mobile computing platform such as a notebook computer. The notebook computer may, for example, include a NIC device 470 as described above. According to some embodiments, a user may view the LED devices 410*a*–*n* (e.g., located on a surface of the notebook computer) to obtain information associated with the NIC device 470. In some embodiments, the user may view the LED devices 410*a*–*n* to determine network connection speed, quality, activity, and/or type, or to otherwise verify network connection functionality.

According to some embodiments, only trained personal such as Information Technology (IT) employees may be interested in and/or may be granted access to such information. For example, as a power saving strategy, the LED devices 410*a*–*n* may generally be turned-off and may only be activated (e.g., in accordance with a duty cycle) when certain events occur. In some embodiments, the power saving strategy may be, include, and/or be defined by a duty cycle determined by the LED controller 420 (and/or the LED duty cycle controller 424). In some embodiments, the input device 450 may be utilized by an IT employee to enter information indicative of a duty cycle and/or a request to turn-on and/or activate the LED devices 410*a*–*n*. In some embodiments, such an indication may be or include the pressing of a button, the clicking of a certain display area with a mouse, and/or the execution of one or more keystrokes on a keyboard (e.g., the pressing of a "hot key" and/or the execution of a keystroke combination). According to some embodiments, the processor 440, upon receiving such an indication (and/or upon identifying the occurrence of such an event), may direct the NIC device 470 to activate the LED devices 410*a*–*n* (e.g., in accordance with a default, power saving, and/or other duty cycle).

In some embodiments, the LED devices 410*a*–*n* may be turned-off until the occurrence of other events. For example, during periods in which no network cable is connected to the NIC device 470 (and/or when no wireless network signal is available) the LED devices 410*a*–*n* may be turned-off. There may be no need to visually indicate network characteristics in the absence of a network connection and/or other network attribute, for example, and thus the LED devices 410*a*–*n* may be deactivated to save power during such periods. If a network cable is connected (and/or a wireless connection is established), the NIC device 470 (and/or the LED controller 420) may, for example, activate the LED devices 410*a*–*n* (e.g., in accordance with a duty cycle).

According to some embodiments, the LED controller 420 may include the LED logic controller 422 and/or the LED duty cycle controller 424. In some embodiments, the functionalities of the two components 422, 424 may be included in and/or performed by the LED controller 420 (e.g., the components 422, 424 may not be required in system 400). According to some embodiments, the LED logic controller 422 may receive signals, commands, and/or other information from the network controller 430. The network controller 430 may, for example, detect network parameters and/or activity and provide information indicative of such parameters and/or activity to the LED logic controller 422. The LED logic controller 422 may then, for example, determine whether the LED devices 410*a*–*n* should be turned-on, turned-off, and/or blinked to provide visual indication of the network parameters and/or activity. According to some embodiments, the LED devices 410*a*–*n* may be illuminated in accordance with instructions received from the LED logic controller 422.

In some embodiments, the processor 440 may receive information indicative of an event from either or both of the input device 450 and the power source 460. According to some embodiments, the processor 440 may identify and/or determine the occurrence of an event. The processor 440 may, for example, monitor the power source 460 and determine that the power source 460 is getting low on power (e.g., the remaining power in the battery reaches a pre-defined level). The processor 440 may then, for example, send a signal indicative of the low-power state to the LED duty cycle controller 424.

The LED duty cycle controller 424 may, according to some embodiments, determine a duty cycle to apply to the LED devices 410*a*–*n* (or to apply to one or more of the LED device 410*a*–*n*). The duty cycle may include, for example, a definition of a low-power blink rate at which the LED devices 410*a*–*n* should be set. In some embodiments, the duty cycle selected and/or otherwise determined by the LED duty cycle controller 424 may be based on information associated with the LED logic controller 422. For example, if the LED logic controller 422 sets the LED devices 410*a*–*n* to blink (e.g., indicating network activity), the LED duty cycle controller 424 may alter a default and/or standard blink pattern and/or rate to one that is configured to conserve power.

According to some embodiments, the LED duty cycle controller 424 may cause the LED devices 410*a*–*n* to illuminate in accordance with a duty cycle that includes a substantially fast blink rate. For example, the LED devices 410*a*–*n* may be blinked at a rate of multiple times per second. Such a fast blink rate may, in some embodiments, cause the LED devices 410*a*–*n* to appear to be turned-on at a steady state, but at a lower intensity (e.g., compared to a normal intensity). Thus, the network activity may still be visually indicated, but power may be conserved as well.

If the LED devices 410a–n are turned-off by the LED logic controller 422 (e.g., indicating no network connection, activity, etc.), the LED duty cycle controller 424 may determine that no action is necessary to conserve power. The LED duty cycle controller 424 may, according to some embodiments, monitor the LED devices 410a–n (and/or interface with the LED logic controller 422) to determine if and/or when they are turned-on. If the LED devices 410a–n are turned-on (e.g., by the LED logic controller 422), the LED duty cycle controller 424 may, for example, then apply the determined duty cycle (or duty cycles) to the activated LED devices 410a–n. In some embodiments, such as where the duty cycle includes turning the LED device 410a–n off, the LED duty cycle controller 424 may prevent the LED devices 410a–n from being activated. According to some embodiments, the LED duty cycle controller 424 may override settings determined and/or applied by the LED logic controller 422.

Figure 5A:
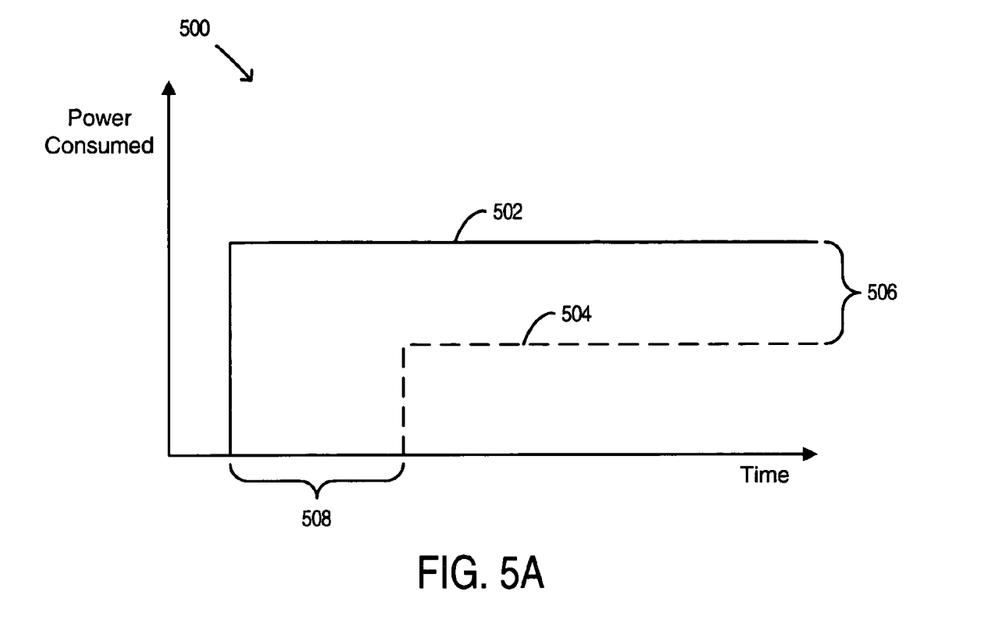
FIG. 5A is a graph of LED illumination according to some embodiments.

Referring to FIG. 5A, a graph 500 of exemplary LED illumination has two axes, one representing an amount of power consumed (e.g., current, voltage, etc.), and one representing time. An LED device may be turned-on and/or illuminated at a certain intensity that draws a certain amount of current. The LED illumination represented by the solid line 502 may, according to some embodiments, represent such an activation of an LED device. In some embodiments for example, the LED device may be set at a certain intensity (e.g., represented by the height of the solid line 502) and may illuminate at that intensity for any period and/or length of time (e.g., represented by the length of the solid line 502).

According to some embodiments, the LED device may be set to and/or illuminated in accordance with a duty cycle. In some embodiments, the duty cycle may cause the LED device to illuminate according to the dashed-line 504. For example, to conserve power in an electronic device, the duty cycle may turn-on the LED device to an intensity (e.g., represented by the height of the dashed-line 504) for a period of time (e.g., represented by the length of the dashed-line 504). In some embodiments, the intensity of the LED may be set lower than a default and/or normal intensity in order to conserve power. The difference between the intensities may, for example, reduce the power consumed by the LED device by a power savings amount 506. In some embodiments, the power savings amount 506 may be determined by the LED controller 220, 420 and the duty cycle may be defined and/or determined based upon the power savings amount 506.

According to some embodiments, the duty cycle may also or alternatively activate the LED device after a time lag 508. For example, even if the intensities according to a default and/or normal illumination and according to a power-saving duty cycle illumination are the same (e.g., the power savings amount may equal zero), the duty cycle may initiate illumination of the LED device after the time lag 508 to conserve power. In some embodiments, the duty cycle may also or alternatively include turning-off the LED device prior to when the default and/or normal illumination pattern would turn-off the LED device. Thus, the duty cycle applied to the LED device may reduce the amount of power consumed by the LED device (e.g., in relation to a standard illumination pattern).

Figure 5B:
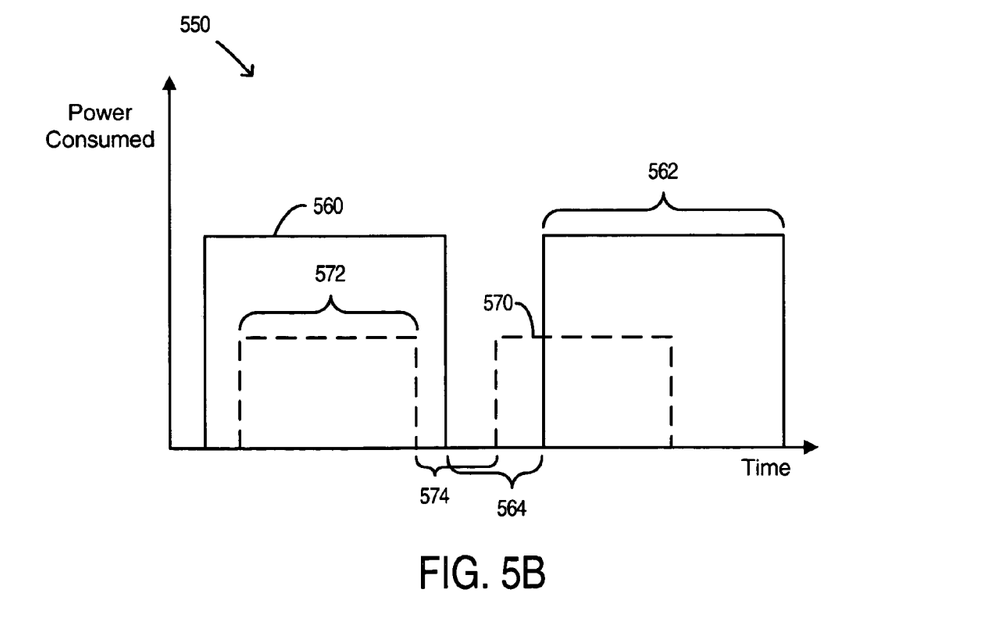
FIG. 5B is a graph of LED illumination according to some embodiments.

In FIG. 5B, a graph 550 of exemplary LED illumination has two axes similar to those described in conjunction with FIG. 5A (e.g., power consumption versus time). The graph 550 also shows a first blinking illumination pattern 560 represented by the solid line. The first blinking pattern 560 may, for example, represent a standard blinking pattern. The first blinking pattern 560 may include and/or be defined by one or more turn-on periods 562 separated by one or more turn-off periods 564. The first blinking pattern 560 may also, as shown in FIG. 5B, include one or more illumination intensities for each associated turn-on period 562 (e.g., represented by the height of the solid line). In some embodiments, the intensity may differ between turn-on periods 562 (not shown in FIG. 5B).

According to some embodiments, one or more duty cycles such as duty cycles configured to conserve power may be applied to LED devices (e.g., by the LED duty cycle controller 424). As shown in FIG. 5B for example, a second blinking illumination pattern 570 may be represented by a dashed-line on graph 550. The blinking pattern 570 may be, for example, a duty cycle such as a power conserving duty cycle. In some embodiments, the blinking pattern 570 may include and/or be defined by one or more turn-on periods 572 separated by one or more turn-off periods 574. The second blinking pattern 570 may also, as shown in FIG. 5B, include one or more illumination intensities for each associated turn-on period 572 (e.g., represented by the height of the dashed-line). In some embodiments, the intensity may differ between turn-on periods 572 (not shown in FIG. 5B).

According to some embodiments, the second blinking pattern 570 may be configured to conserve power with respect to the first blinking pattern 560. For example, the second blinking pattern 570 may include fewer and/or shorter turn-on periods 572 than the turn-on periods 562 utilized by the first blinking pattern 560. The second blinking pattern 570 may also or alternatively include longer and/or more turn-off periods 574 than the turn-off periods 564 utilized by the first blinking pattern 560. In some embodiments, the second blinking pattern 570 may include one or more turn-on periods 572 that cause illumination at a lower intensity than one or more of the turn-on periods 562 of the first blinking pattern 560. As shown in FIG. 5B for example, the second blinking pattern 570 may represent a power-saving duty cycle that includes smaller and less intense turn-on periods 572 and longer turn-off periods 574 than those associated with other duty cycles and/or illumination patterns (e.g., the first blinking pattern 560).

In some embodiments, a blinking pattern defined by a duty cycle may be applied to an LED device instead of a standard illumination pattern that includes continuous illumination at a certain intensity. The second blinking pattern 570 may, for example, be applied to an LED device in place of the illumination pattern represented by the solid line 502 in FIG. 5A. In some embodiments, the second blinking pattern 570 may include substantially short turn-off periods 574. According to some embodiments, even if the actual intensities of the second blinking pattern 570 turn-on periods 572 are substantially equivalent to the intensity of the solid line 502, the blink rate of the second blinking pattern 570 may cause an LED device to appear to be illuminated in accordance with a pattern similar to that represented by the dashed-line 504 of FIG. 5A.

For example, a substantially fast blink rate may conserve power (e.g., by including turn-off periods) while having the visual appearance of a continuous illumination (e.g., such as how a computer monitor appears to undergo constant and/or steady illumination, while in fact the screen is refreshed many times per second). In some embodiments, the LED controller 220, 420 and/or the LED duty cycle controller 424 may determine and/or implement such illumination (e.g., via one or more duty cycles).

Figure 6:
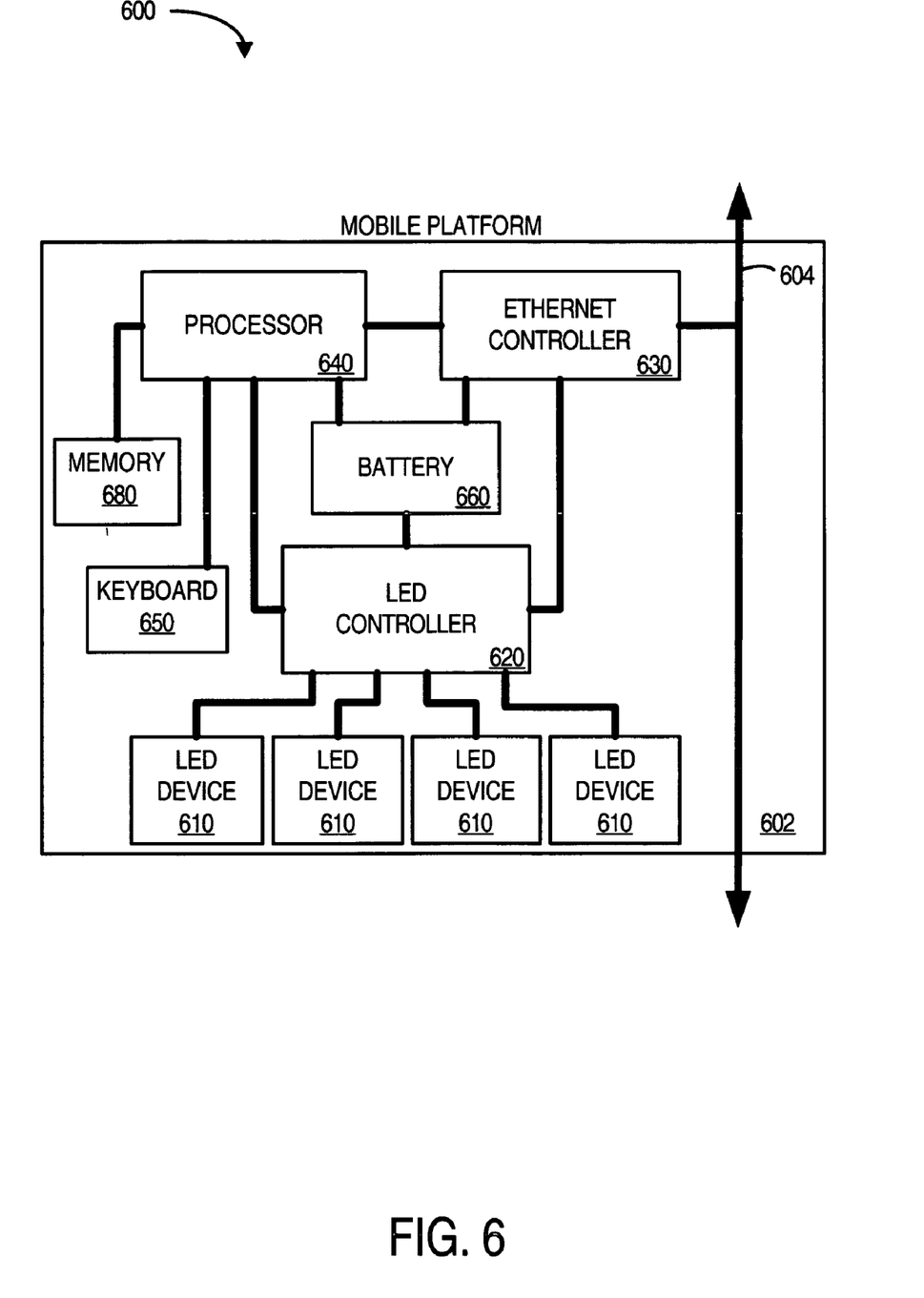
FIG. 6 is a block diagram of a system according to some embodiments.

Turning now to FIG. 6, a block diagram of a system 600 according to some embodiments is shown. The system 600 may, for example, be associated with the method 300 described above and/or may be similar in configuration and/or functionality to the systems 200, 400 described in conjunction with FIG. 2 and/or FIG. 4. In some embodiments, the system 600 may utilize duty cycles as defined generally herein and/or as described in conjunction with FIG. 5A and/or FIG. 5B. Fewer or more components that are shown in FIG. 6 may, according to some embodiments, be included in the system 600. In some embodiments, the components 610, 620, 630, 640, 650, 660 of the system 600 may be similar in configuration and/or functionality to the similarly-named components described in conjunction with FIG. 1, FIG. 2, and/or FIG. 4.

The system 600 may be or include, for example, a mobile platform 602 such as a notebook computer, PDA, and/or wireless telephone. In some embodiments, the mobile platform 602 may include a communication path 604 that allows wired and/or wireless communications. The mobile platform 602 may utilize the communications path 604, for example, to communicate with other mobile platforms over one or more networks. In some embodiments, the mobile platform 602 and/or the system 600 may include a plurality of LED devices 610. The LED device 610 may, for example, be used to provide visual indication of parameters, metrics, attributes, and/or activity associated with the communications path 604.

Any or all of the LED devices 610 may, according to some embodiments, be controlled, managed, and/or dimmed by an LED controller 620. The LED controller 620 may, for example, operate in accordance with various embodiments described herein to apply a duty cycle to the LED devices 610 and/or to reduce the power consumed by the LED devices 610. The LED controller 620 may, according to some embodiments, operate in accordance with and/or perform the method 300 described in conjunction with FIG. 3, to conserve the power of the mobile platform 602. In some embodiments, the LED controller 620 may receive power consumption information from the Ethernet controller 630, the processor 640, the keyboard 650, and/or the battery 660.

In some embodiments for example, a user may utilize the keyboard 650 to program instructions defining certain power conservation events (e.g., low battery levels, or high ambient light levels). Instructions and/or other information supplied, entered, and/or identified by the user utilizing the keyboard 650 may, for example, be stored in the memory 680 of the mobile platform 602. According to some embodiments, the processor 640 may solicit and/or receive information associated with the power level of the battery 660. This information may be compared, for example, to rules, instructions, or other information stored within the memory 680. Based on the comparison, the processor 640 may, according to some embodiments, create and/or send a power consumption signal to the LED controller 620.

If the power level of the battery 660 is determined to be getting low and/or otherwise meets the criteria of a rule stored within the memory 680 (and/or received from the keyboard 650 or determined by the processor 640), for example, the processor 640 may send information indicative of the occurrence of such an event to the LED controller 620. The LED controller 620 may then, according to some embodiments, determine a duty cycle appropriate for conserving power. Such a duty cycle may then be sent and/or otherwise applied to one or more of the LED device 610, in some embodiments. Thus, the power available to the mobile platform 602 (e.g., via the battery 660) may be conserved by managing the illumination of the LED devices 610.

The several embodiments described herein are solely for the purpose of illustration. Those skilled in the art will note that various substitutions may be made to those embodiments described herein without departing from the spirit and scope of the present invention. Those skilled in the art will also recognize from this description that other embodiments may be practiced with modifications and alterations limited only by the claims.

What is claimed is:

1. A method, comprising:
   receiving a power consumption signal indicating that a computer system is associated with a low-power mode;
   defining an on-state of a light-emitting diode associated with a status of the computer system, the status being associated with something other than the low-power mode; and
   determining a duty cycle of the light-emitting diode based at least in part on the power consumption signal, the duty cycle to reduce a power consumed by the light-emitting diode, wherein said determining the duty cycle varies at least one of an on-period and an off-period, for the on-state, of the light-emitting diode.

2. The method of claim 1, further comprising:
   sending a signal associated with the determined duty cycle to the light-emitting diode.

3. The method of claim 2, wherein the duty cycle signal causes the light-emitting diode to illuminate in accordance with the determined duty cycle.

4. The method of claim 1, wherein the power consumption signal is received from a user.

5. The method of claim 1, wherein the power consumption signal is received from a processor.

6. The method of claim 5, wherein the power consumption signal is generated by the processor at least in part in response to an event.

7. The method of claim 6, wherein the event includes an occurrence of a device having a pre-determined power level.

8. The method of claim 7, wherein the device is a mobile computing device.

9. The method of claim 1, wherein the light-emitting diode is a visual indicator associated with a mobile computing device.

10. The method of claim 9, wherein the light-emitting diode is a visual indicator of at least one network attribute associated with the mobile computing device.

11. The method of claim 1, wherein the duty cycle includes reducing the intensity of the illumination of the light-emitting diode for a period of time within the on-state.

12. An apparatus, comprising:
    a storage medium having stored thereon instructions that when executed by a machine result in the following:
    receivin a ower consumption signal indicating that a computer system is associated with a low-power mode;
    defining an on state of a light-emitting diode associated with a status of the computer system, the status beiua associated with something other than the low-power mode; and
    determining a duty cycle of the light-emitting diode based at least in part on the power consumption signal, the duty cycle to reduce the power consumed by the light-emitting diode, wherein said determining the duty cycle includes varying at least one of an on-period and an off-period for the on-state of the light-emitting diode.

13. The apparatus of claim 12, wherein the instructions, when executed by a machine, further result in the:
   sending a signal associated with the detennined duty cycle to the light-emitting diode.

14. The apparatus of claim 13, wherein the duty cycle signal causes the light-emitting diode to illuminate in accordance with the determined duty cycle.

15. A system, comprising:
   a portable electronic device having a low-power mode, including:
      a battery;
      a processor powered by the battery;
      a light-emitting diode to provide a visual indication associated with a status of the potable electronic device, the status being associated with something other than the low-power mode; and
      a light-emitting diode controller to control the power consumption of the light-emitting diode, when in the low-power mode, the light-emitting diode controller to vary a duty cycle of at least one of an on-period and an off-period, for an on-state, of the light-emitting diode.

16. The system of claim 15, wherein the light-emitting diode is a visual indicator of at least one attribute associated with a communication path.

17. The system of claim 15, wherein the light-emitting diode controller determines a duty cycle to reduce the power consumed by the light-emitting diode.

18. The system of claim 17, wherein the light-emitting diode controller causes the light-emitting diode to illuminate in accordance with the determined duty cycle.

19. The system of claim 15, wherein reducing the intensity of the illumination of the light-emitting diode for the on-state includes reducing a magnitude of a voltage or current applied to the light-emitting diode within the on-state.

20. A method, comprising:
   receiving a power consumption signal indicating that a computer system is associated with a low-power mode;
   defining an on-state of a light-emitting diode associated with a status of the computer system, the status being associated with something other than the low-power mode; and
   determining a duty cycle within the on-state of the light-emitting diode based at least in part on the power consumption signal, the duty cycle to reduce the power consumed by the light-emitting diode, said determining the duty cycle to include an on-period and an off-period for the on-state of the light-emitting diode, wherein the on-period is associated with a maximum power level, and the off-period is associated with a minimum power level.

21. The method of claim 20, further comprising cycling at least once between the off-period and the on-period within the on-state of the light emitting diode.

* * * * *

UNITED STATES PATENT AND TRADEMARK OFFICE
CERTIFICATE OF CORRECTION

| | | |
|---|---|---|
| PATENT NO. | : 7,190,121 B2 | Page 1 of 1 |
| APPLICATION NO. | : 10/921492 | |
| DATED | : March 13, 2007 | |
| INVENTOR(S) | : Tal Rose and Avi Costo | |

It is certified that error appears in the above-identified patent and that said Letters Patent is hereby corrected as shown below:

Col. 12, lines 15-27
12. An apparatus, comprising:
 a storage medium having stored thereon instructions that when executed by a machine result in the following:
 "receivin" --receiving-- a "ower" --power-- consumption signal indicating that a computer system is associated with a low-power mode;
 defining an on state of a light-emitting diode associated with a status of the computer system, the status "beiua" --being-- associated with something other than the low-power mode; and
 determining a duty cycle of the light-emitting diode based at least in part on the power consumption signal, the duty cycle to reduce the power consumed by the light-emitting diode, wherein said determining the duty cycle includes varying at least one of an on-period and an off-period for the on-state of the light-emitting diode.

Col. 13, lines 4-7
13. The apparatus of claim 12, wherein the instructions, when executed by a machine, further result in the:
 sending a signal associated with the "detennined" --determined-- duty cycle to the light-emitting diode.

Signed and Sealed this

Twenty-eighth Day of August, 2007

JON W. DUDAS
*Director of the United States Patent and Trademark Office*